US006789496B2

(12) United States Patent
Gehris

(10) Patent No.: US 6,789,496 B2
(45) Date of Patent: Sep. 14, 2004

(54) EQUIPMENT FLAGGING DEVICE

(76) Inventor: Devon M. Gehris, P.O. Box 361, East Stroudsburg, PA (US) 18301

( * ) Notice: Subject to any disclaimer, the term of this patent is extended or adjusted under 35 U.S.C. 154(b) by 0 days.

(21) Appl. No.: 10/352,118

(22) Filed: Jan. 28, 2003

(65) Prior Publication Data

US 2004/0144298 A1 Jul. 29, 2004

(51) Int. Cl.[7] .......... G06F 17/00
(52) U.S. Cl. .......... 116/173; 116/28 R
(58) Field of Search .......... 116/28 R, 63 P, 116/173, 174, DIG. 41; 40/591, 599, 586; 446/215; D11/165, 166, 181, 182

(56) References Cited

U.S. PATENT DOCUMENTS

| | | | | | |
|---|---|---|---|---|---|
| 1,374,002 | A | * | 4/1921 | Tracey | 446/247 |
| 1,484,485 | A | * | 2/1924 | Fred | 116/173 |
| 1,535,844 | A | | 4/1925 | McLemore | |
| 1,595,395 | A | | 8/1926 | Herbener | |
| 1,635,915 | A | | 7/1927 | White | |
| 1,854,012 | A | * | 4/1932 | Annin | 116/173 |
| 2,166,520 | A | | 7/1939 | Challoner | 40/128 |
| 2,192,514 | A | | 3/1940 | Carleton | 40/2 |
| 2,656,869 | A | * | 10/1953 | Timmons | 116/173 |
| 3,439,446 | A | * | 4/1969 | Alonso | 446/266 |
| 3,678,886 | A | | 7/1972 | Tibbet | 116/173 |
| 3,910,226 | A | * | 10/1975 | McGahee | 116/173 |
| 4,105,190 | A | * | 8/1978 | Curtis | 256/1 |
| 4,477,073 | A | * | 10/1984 | Koch et al. | 482/91 |
| 4,813,369 | A | * | 3/1989 | Moreland | 116/173 |
| 4,906,503 | A | * | 3/1990 | De La Cruz et al. | 116/173 |
| 5,329,873 | A | * | 7/1994 | Tiballi | 116/173 |
| 5,685,255 | A | | 11/1997 | Arzu | 116/30 |
| 5,706,756 | A | * | 1/1998 | Cunningham et al. | 116/173 |
| 5,904,116 | A | * | 5/1999 | Wyner et al. | 116/173 |
| 5,979,355 | A | | 11/1999 | LeBlanc | 116/30 |
| 6,371,043 | B1 | * | 4/2002 | Pearison | 116/173 |
| 6,389,659 | B1 | * | 5/2002 | Jacobs | 116/173 |
| 6,584,927 | B1 | * | 7/2003 | Iversen et al. | 116/173 |
| 2003/0056409 | A1 | * | 3/2003 | Herbert | 40/214 |
| 2003/0192467 | A1 | * | 10/2003 | Paris | 116/173 |

* cited by examiner

*Primary Examiner*—Christopher W. Fulton
*Assistant Examiner*—R. Alexander Smith
(74) *Attorney, Agent, or Firm*—Richard C. Litman

(57) ABSTRACT

An equipment flagging device. The equipment flagging device is made up of a generally square shaped planar sheet of material and a cord with a first end, a second end and an elongated body. The first end is attached to the generally square shaped planar sheet of material and the second end forms a closed loop, which is used as part of a slipknot to secure the equipment flagging device to any extending equipment or material.

10 Claims, 5 Drawing Sheets

EQUIPMENT FLAGGING DEVICE

BACKGROUND OF THE INVENTION

1. Field of the Invention

The present invention relates to safety signaling in general and, more specifically, to an equipment flagging device.

2. Description of the Related Art

On the road highway safety is always an essential part of transporting heavy construction equipment and materials. Many times construction equipment or materials extend from the back, front or sides of a vehicle transporting such equipment while driving on public roadways. There are many devices that inform and notify other vehicles that this construction equipment or other hazard exists. These devices are also well-known and are reflected in the related art.

U.S. Pat. No. 1,535,844 issued to McLemore, outlines the use of a danger signal that is adapted to be applied to the extended or projecting portion of the load of a vehicle. The danger signal is a relatively simple, practical and effective danger signal that may be easily and quickly applied to a vehicle and its extended load.

U.S. Pat. No. 1,595,395 issued to Herbener, outlines the use of a flag that was originally designed for use in the railway industry. The flag embodies a slipover head or hem, which is adapted to be inserted upon a flagstaff. The flag is equipped with strings, which are preferably permanently attached to the hem for tying the slipover hem upon the flagstaff.

U.S. Pat. No. 1,635,915 issued to White, outlines the use of a traffic warning device to be attached to any element forming part of a load carried by a motor truck when the load projects beyond the body of the vehicle. The traffic-warning device is so conspicuous that it is easily observed and distinguished from the load and body of the vehicle.

U.S. Pat. No. 2,166,520 issued to Challoner, outlines the use of a simple and efficient signal flag attachment that is mountable on any truck. The attachment is an extendible device capable of ready use in connection with truckloads of various shapes and sizes.

U.S. Pat. No. 2,192,514 issued to Carleton, outlines the use of a marking tag having a relatively flat marking surface that can be written on with a pencil, with the writing being readily removable by the use of an ordinary pencil eraser. The writing on the marking tag remains, even if the marking tag is left outdoors and is subjected to the elements over a long period of time.

U.S. Pat. No. 3,678,886 issued to Tibbet, outlines the use of a flag and a secure wrap-around carrier for the flag, designed for use with protruding logs and like loads, which forms a complete unitary structure of extreme versatility. To this end, a flag of suitable size, shape, color and material is provided, having a hem that extends along one flag margin, within which hem a portion of the carrier may be received, the carrier being detachably secured to the flag near one end of the hem.

U.S. Pat. No. 5,685,255 issued to Arzu, outlines the use of a flag warning device for attachment to extended loads, such as ladders or extended items, that are in the trunk of a standard vehicle and which are too large to fit in the trunk and require that the trunk be opened while the items extend out from the back. The flag warning device has a central portion which has an open mesh type surface so that the wind can blow through it and cause it to remain essentially vertical so that it can be easily seen by the oncoming traffic.

U.S. Pat. No. 5,979,355 issued to LeBlanc, outlines the use of a tail flag assembly for installation on the end of a utility pole laid on a pole trailer. The tail flag assembly includes a ring mountable over the rear end of the pole and a plurality of screws extending radially through the ring for clamping the ring onto the rear end of the pole. The tail flag assembly also has a plurality of staffs affixed to the ring, with each staff having a rectangular colored flag attached thereto.

Although each of these devices are novel and useful, all of them are not easily installed onto an extending load. The equipment flagging device should be adaptable to many different applications. The equipment flagging device is not used only for construction equipment, such as ladders, but should also be capable of being used in other applications. The equipment flagging device must also be conveniently used with lawnmowers that hang off of lawn care trucks and with furniture that is being transported on the back of a truck.

Therefore what is needed is an equipment flagging device that provides a quick and easy means to make transported items more visible. What is further needed is an equipment flagging device that is easily stored in a weather proof pouch. What is still further needed is an equipment flagging device that is reusable and has a durable construction that protects the device from wind and other weather conditions. Finally, what is needed is an equipment flagging device that may be created in varying sizes and colors that provide high visibility for many different situations.

None of the above inventions and patents, taken either singularly or in combination, is seen to describe the instant invention as claimed. Thus a construction equipment-flagging device solving the aforementioned problems is desired.

SUMMARY OF THE INVENTION

The invention is an equipment flagging device. The equipment flagging device is made up of a generally square shaped planar sheet of material and a cord with a first end, a second end and an elongated body. Depending on how the equipment flagging device is being used the elongated body may range from 6 inches to 36 inches in length. Varying sizes are necessary because the equipment flagging device may be used in various applications including, but not limited to, construction equipment, lawnmowers on lawn care trucks, and furniture that is being transported on an open truck. The first end is attached to the generally square shaped planar sheet of material and the second end forms a closed loop, which is used as part of a slipknot to secure the equipment flagging device to any extending equipment or material.

Accordingly, it is a principal object of the invention to provide an equipment flagging device that is easy to install onto an extended piece of equipment or material.

It is another object of the invention to provide an equipment flagging device that can be quickly placed on an extended piece of equipment or material.

It is a further object of the invention to provide an equipment flagging device that is durable and reusable.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
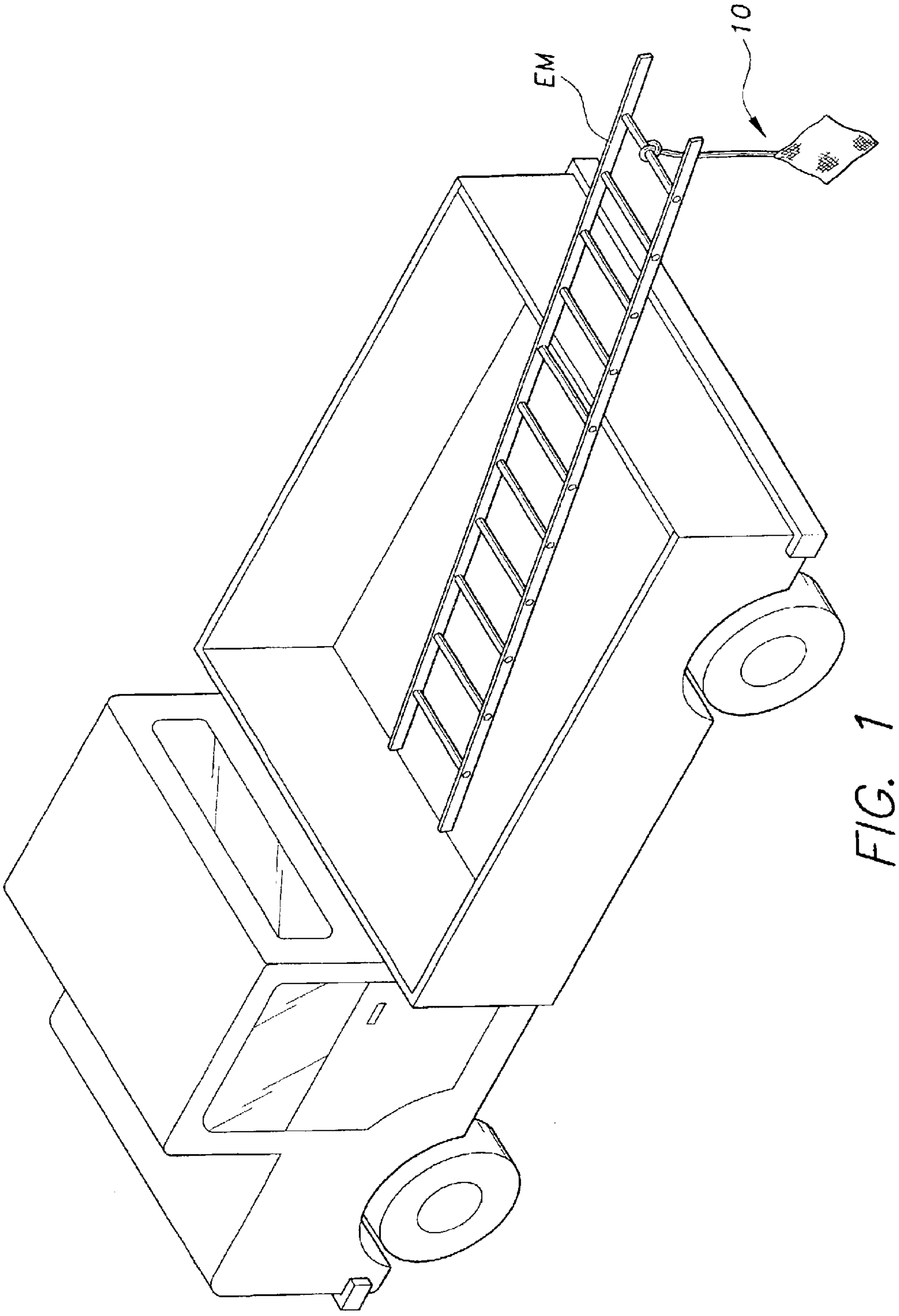
FIG. 1 is an environmental, perspective view of an equipment flagging device according to the present invention.

The present invention is an equipment flagging device 10, used for indicating extended equipment or material EM, as is shown in FIG. 1. The equipment flagging device 10 is typically used when equipment or materials are extended or hanging out of a vehicle and causing a hazard.

Figure 2:
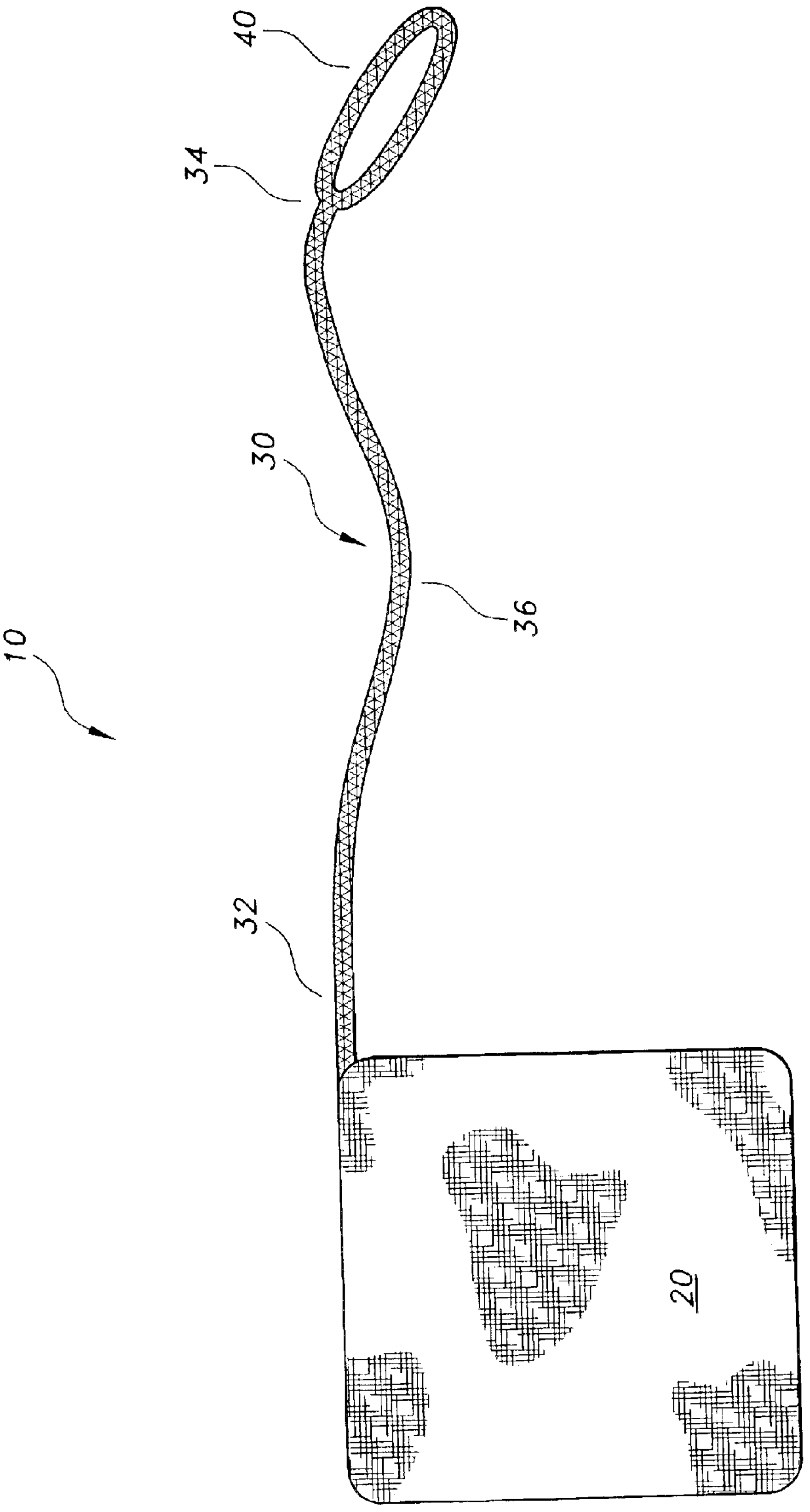
FIG. 2 is a top plan perspective view of an equipment flagging device.

The equipment flagging device 10 depicted in FIG. 2 comprises a generally square shaped planar sheet of material 20, a cord 30 with a first end 32, a second end 34 and an elongated body 36, the first end 32 is attached to the generally square shaped planar sheet of material 20 and the second end 34 forms a closed loop 40. To use the equipment flagging device 10, the generally square shaped planar sheet of material 20 is pulled through the closed loop 40 and the elongated body 36 becomes wrapped around the extended piece of equipment or material EM and is tightened to secure the equipment flagging device 10 to the extended piece of equipment or material EM. Once tightened to an extended piece of equipment or material EM, the equipment flagging device 10 can be easily untightened and reused as desired.

Figure 3:
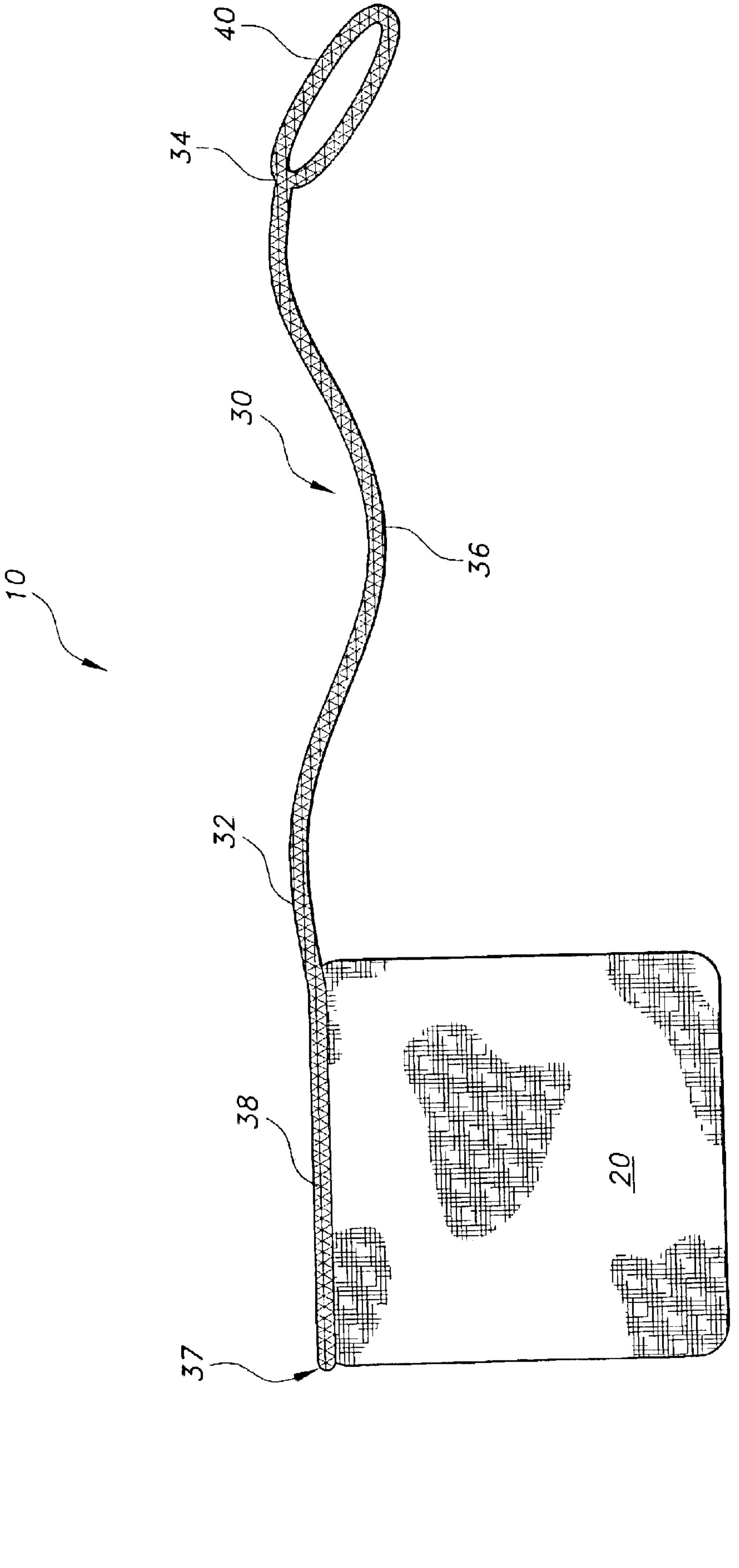
FIG. 3 is a perspective view of an alternate embodiment of the equipment flagging device.
Figure 3A:
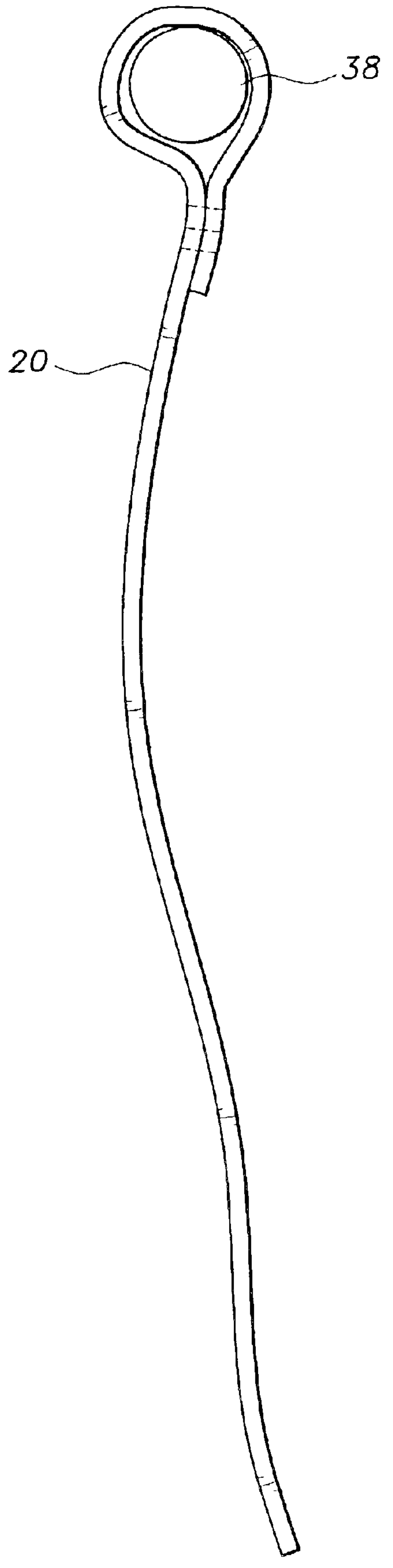
FIG. 3A is a side view of the alternate embodiment of the equipment flagging device depicted in FIG. 3.

A second embodiment of the equipment flagging device 10 is depicted in FIG. 3. In this particular embodiment the cord 30 extends across the top surface of the generally square shaped planar sheet of material 20 to the far corner 37. This produces a spine 38 that provides more stability to the equipment flagging device 10. FIG. 3A shows a side view of the equipment flagging device 10 depicted in FIG. 3. The generally square shaped planar sheet of material 20 is folded over the spine 38 and then stitched together to form a good and secure attachment to the cord 30.

The cord 30 of the equipment flagging device 10 is preferably made of a synthetic material such as braided nylon, polyester or polypropylene. The cord 30, however, is not limited to these materials and may be made from any suitable material. The generally square shaped planar sheet of material 20 is preferably made of a durable synthetic material such as cloth, plastic, polyvinyl chloride (PVC), polyvinyls, coated fabrics, nylons, polyesters, or laminated fabrics. The planar sheet of material 20 is not limited to these materials and may be made from any suitable material that is well-known to those that are schooled in the related art. Both the generally square shaped planar sheet of material 20 and the cord 30 are designed to withstand harsh weather and the elements.

The cord 30 and the generally square shaped planar sheet of material 20 are also bright red for easy visibility. The generally square shaped planar sheet of material 20, however, may be made in any color that the user chooses. In certain preferred embodiments the generally square shaped planar sheet of material 20 can also be provided with a design to be used as a logo, advertisement or flag.

The equipment flagging device 10 may also vary in its shape. Typically the generally square shaped planar sheet of material 20 is either rectangular or square, but is not limited to these shapes. In general, the planar sheet of material 20 may be as small as 6 inches×6 inches or even 3 inches×5 inches. The planar sheet of material 20, however, may be as large as 20 inches×20 inches or 24 inches×36 inches. The planar sheet of material 20, is not limited to these sizes and may be made any size depending on the particular application. The length of the cord 30 can vary depending on the length of cord 30 needed for a respective job or project.

Figure 4:
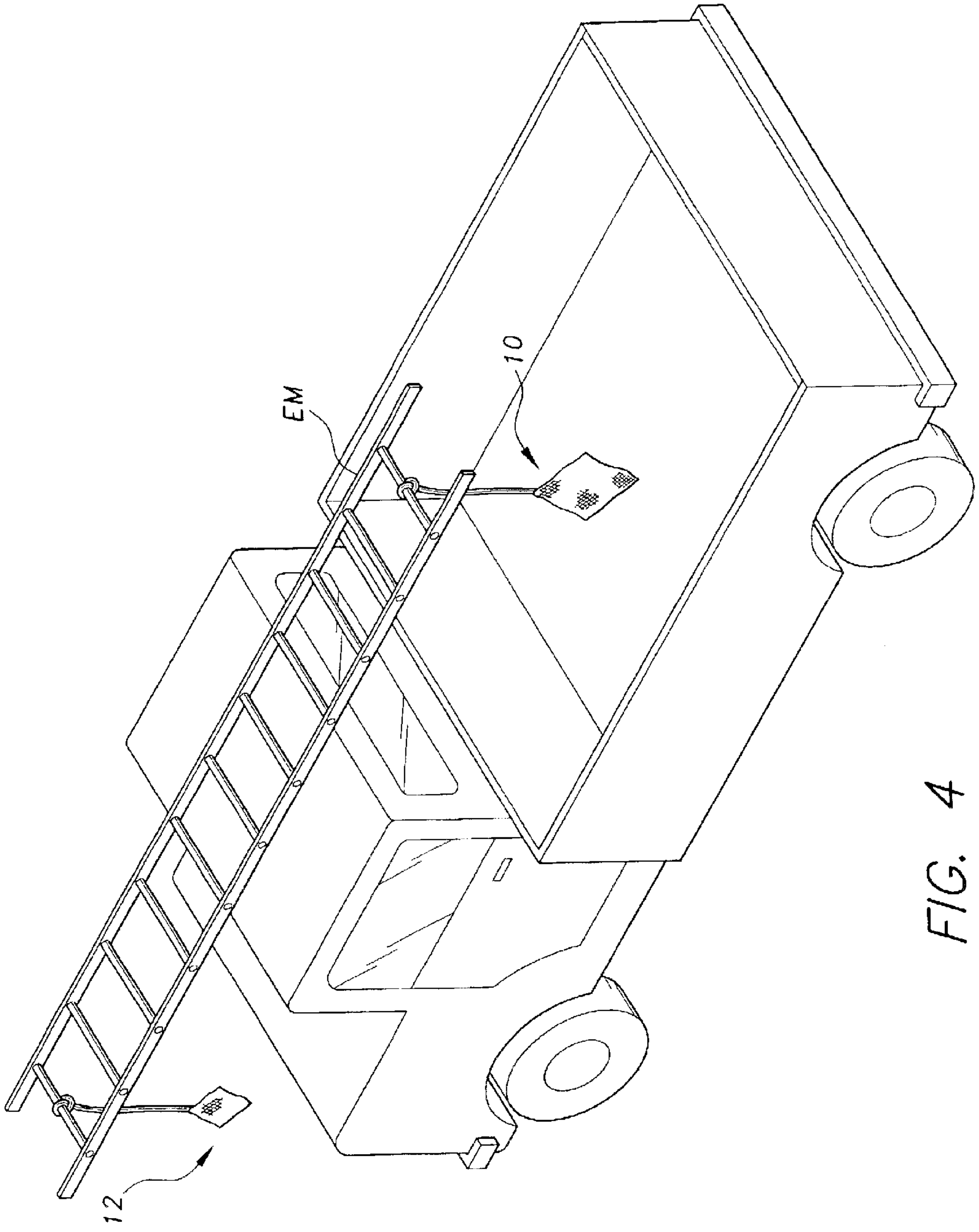
FIG. 4 is an environmental, perspective view of multiple equipment flagging devices being simultaneously used on an extension ladder on the top of a truck.

Depending on the particular application and placement of the equipment flagging device 10, the location of the generally square shaped planar sheet of material 20 will vary. The equipment flagging device 10 may be placed on the front of the vehicle, the back of the vehicle or even the antenna of the vehicle. FIG. 4 depicts a situation where multiple equipment flagging devices are being simultaneously used. In FIG. 4 a truck is equipped with an extension ladder EM on the top of the truck.

The present extension ladder EM extends past the front of the truck as well as the back of the truck making it necessary to use more than one equipment flagging device 10. A first equipment flagging device 10 is located on the rear of the extension ladder EM. A second equipment flagging device 12 is located on the front of the extension ladder EM. The rear equipment flagging device 10 is larger than the front equipment flagging device 12.

It is to be understood that the present invention is not limited to the embodiments described above, but encompasses any and all embodiments within the scope of the following claims.

I claim:

1. An equipment flagging device, used for indicating an extended piece of equipment or material, comprising:

a generally square shaped planar sheet of material having a top edge of a predetermined length; and an elongated cord having a first section extending from a first end, and a second end the first section having a length substantially equal to the length of the top edge of said sheet of material;

wherein the first section of said cord is stitched alone the top edge of said sheet of material; and the second end of said cord is formed as a closed loop;

whereby the cord is adapted to be wrapped around the extended piece of equipment or material, the generally square shaped planar sheet of material is pulled through the closed loop, and is tightened to secure the equipment flagging device to the extended piece of equipment or material.

2. The equipment flagging device according to claim 1, wherein the cord is made of material selected from the group consisting of braided nylon, polyester, and polypropylene.

3. The equipment flagging device according to claim 2, wherein the cord is made of braided nylon.

4. The equipment flagging device according to claim 1, wherein the generally square planar sheet of material is made from material selected from the group consisting of polyvinyl chloride, coated fabrics, polyvinyls, nylons, polyesters,laminated fabrics, durable synthetic cloth or plastics.

5. The equipment flagging device according to claim 1,wherein the cord and the generally square planar sheet of material are bright red.

6. An equipment flagging device, used in combination with an extended equipment or material used for indicating an extended piece of equipment or material, comprising:

a generally square shaped planar sheet of material having a top edge of a length; and an elongated cord having a first section extending from a first end, and a second end, the first section having a length substantially equal to the length of the top edge of said sheet of material;

wherein the first section of said cord is stitched alone the top edge of said sheet of material; and the second end of said cord is formed as a closed loop;

whereby said cord is wrapped around the extended piece of equipment or material,the generally square shaped planar sheet of material is pulled through the closed loop, and is tightened to secure the equipment flagging device to the extended piece of equipment or material.

7. The equipment flagging device according to claim 6, wherein the cord is made of material selected from the group consisting of braided nylon, polyester, and polypropylene.

8. The equipment flagging device according to claim 7, wherein the cord is made of braided nylon.

9. The equipment flagging device according to claim 6, wherein the generally square planar sheet of material is made from material selected from the group consisting of polyvinyl chloride, coated fabrics, polyvinyls, nylons, polyesters,laminated fabrics, durable synthetic cloth or plastics.

10. The equipment flagging device according to claim 6, wherein the cord and the generally square planar sheet of material are bright red.

* * * * *